United States Patent
Tsumura et al.

(10) Patent No.: US 9,630,585 B2
(45) Date of Patent: Apr. 25, 2017

(54) FASTENING STRUCTURE OF SIDE CURTAIN AIRBAG

(71) Applicant: HONDA MOTOR CO., LTD., Tokyo (JP)

(72) Inventors: Takahide Tsumura, Wako (JP); Soichi Nishikawa, Wako (JP); Koji Ikeda, Wako (JP); Taro Shimizu, Wako (JP); Kento Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/136,285

(22) Filed: Apr. 22, 2016

(65) Prior Publication Data

US 2016/0311390 A1 Oct. 27, 2016

(30) Foreign Application Priority Data

Apr. 23, 2015 (JP) ................... 2015-088400

(51) Int. Cl.
*B60R 21/213* (2011.01)
*B60R 21/201* (2011.01)

(52) U.S. Cl.
CPC .......... *B60R 21/213* (2013.01); *B60R 21/201* (2013.01)

(58) Field of Classification Search
CPC .................... B60R 21/213; B60R 21/201
See application file for complete search history.

(56) References Cited

U.S. PATENT DOCUMENTS

| | | | | |
|---|---|---|---|---|
| 7,712,775 B2* | 5/2010 | Sato | ..................... | B60R 13/0206 280/728.2 |
| 8,286,991 B2* | 10/2012 | Shimazaki | ............ | B60R 21/213 280/728.2 |
| 2006/0043708 A1* | 3/2006 | Inazu | .................... | B60R 21/213 280/730.2 |
| 2007/0052220 A1* | 3/2007 | Hidaka | ................. | B60R 21/213 280/730.2 |
| 2007/0063490 A1* | 3/2007 | Minamikawa | ........ | B60R 21/201 280/728.2 |
| 2009/0278336 A1* | 11/2009 | Minamikawa | ........ | B60R 21/213 280/728.2 |
| 2010/0127484 A1* | 5/2010 | Son | ....................... | B60R 21/213 280/730.2 |
| 2014/0062066 A1* | 3/2014 | Mori | .................... | B60R 21/213 280/728.2 |

FOREIGN PATENT DOCUMENTS

JP 2008-179223 A 8/2008

* cited by examiner

*Primary Examiner* — Faye M Fleming
(74) *Attorney, Agent, or Firm* — Westerman, Hattori, Daniels & Adrian, LLP

(57) ABSTRACT

A side curtain airbag includes a protector that holds a bag body and that guides deployment of the bag body and a bag bracket that is fastened to a bag attaching seat located between two grab rail attaching seats protruded from a roof side portion and that is used to attach the side curtain airbag to the roof side portion. Portions of the protector which are located between the two grab rail attaching seats and which are located at both sides of the bag attaching seat in the vehicle front-rear direction are provided with first cutout portions.

4 Claims, 4 Drawing Sheets

FASTENING STRUCTURE OF SIDE CURTAIN AIRBAG

CROSS REFERENCES TO RELATED APPLICATIONS

The present application claims priority under 35 U.S.C. §119 to Japanese Patent Application No. 2015-088400, filed Apr. 23, 2015, entitled "Fastening Structure of Side Curtain Airbag." The contents of this application are incorporated herein by reference in their entirety.

BACKGROUND

1. Field

The present disclosure relates to a fastening structure of a side curtain airbag.

2. Description of the Related Art

Roof side portions of a vehicle are provided with a side curtain airbag (hereinafter, simply referred to as curtain airbag), a grab rail, and other various interior component parts. A curtain airbag includes a bag body that is deployed into a curtain shape when an impact is input, a protector that holds the bag body and guides the deployment of the bag body, and a bag bracket that fastens the curtain airbag to a bag attaching seat that is disposed on a roof side portion of a vehicle (see, e.g., Japanese Unexamined Patent Publication No. 2008-179223).

A grab rail has an arch shape that is bulged inward in a vehicle transverse direction. Two end portions of the grab rail are separately attached to two grab rail attaching seats that protrude inward in the vehicle transverse direction from a roof side portion.

Since various interior component parts are attached to a roof side portion of a vehicle as described above, the layout of the attaching seats for the various interior component parts is restricted. For example, in some cases where a bag attaching seat of a curtain airbag is set between a pair of grab rail attaching seats, it can happen that the protector of the curtain airbag and the grab rail attaching seat interfere with each other at the time of attaching the bag bracket to the bag attaching seat. If that happens, it is necessary to force the bag bracket in toward the bag attaching seat despite interference of the protector with the grab rail attaching seat, giving rise to a problem of poor workability.

SUMMARY

The present application describes a side curtain airbag fastening structure that allows improved workability.

According to an aspect of the present disclosure there is provided a side curtain airbag fastening structure that includes two (a pair of) grab rail attaching seats (e.g., a grab rail attaching seat 23 in an embodiment) which are protruded inward in a vehicle transverse direction from a roof side portion (e.g., a roof side portion 3 in the embodiment) of a vehicle (e.g., a vehicle 2 in the embodiment) and spaced from each other in a vehicle front-rear direction and to which a grab rail is attached and a side curtain airbag (e.g., a side curtain airbag 1 in the embodiment) that is attached to the roof side portion and that includes a bag body (e.g., a bag body 42 in the embodiment) that is deployed into a curtain shape from the roof side portion when an impact is input. The side curtain airbag further includes a protector (e.g., a protector 43 in the embodiment) that holds the bag body and that guides deployment of the bag body and a bag bracket (e.g., a bag bracket 45A in the embodiment) that is fastened to a bag attaching seat (e.g., a bag attaching seat 22 in the embodiment) located between the two grab rail attaching seats protruded from the roof side portion and that is used to attach the side curtain airbag to the roof side portion in such a manner that the protector and the bag body are disposed along the roof side portion and in a vicinity of the two grab rail attaching seats, typically, underneath the two grab rail attaching seats. Portions of the protector which are located between the two grab rail attaching seats and which are located at both sides of the bag bracket in the vehicle front-rear direction are provided with first cutout portions (e.g., cutout portions 71 in the embodiment).

According to this construction, in order to attach the bag bracket to the bag attaching seat, the side curtain airbag is moved toward the bag attaching seat. Then, the protector comes to interfere with the grab rail attaching seats, so that the movement of the side curtain airbag toward the bag attaching seat relative to the grab rail attaching seats is restricted. If in this state, the side curtain airbag is pushed in toward to the bag attaching seat, stress concentrates at the first cutout portions of the protector, so that the protector elastically deforms, with the first cutout portions serving as start points of elastic deformation. Thus, the portions of the protector which are located between the grab rail attaching seats are pushed in together with the bag body toward the bag attaching seat, with the grab rail attaching seats serving as fulcrums, so that the bag bracket can be attached to the bag attaching seat.

As described above, when the protector is pushed in toward the bag attaching seat from the state in which the protector and the grab rail attaching seats are interfering with each other, the protector readily deforms elastically. Therefore, the workability at the time of assembling the bag bracket and the bag attaching seat can be improved.

In the foregoing side curtain airbag fastening structure, the protector may be provided with a second cutout portion (e.g., a tape securement portion 64 in the embodiment) that is formed along a direction of extension of the first cutout portions and that holds a tape (e.g., a tape 62 in the embodiment) that binds the bag body and the protector together. Furthermore, a length of the first cutout portions in the direction of extension may be greater than a length of the second cutout portion in the direction of extension.

In this construction, because the length of the first cutout portions in the direction of extension is greater than that of the second cutout portion, the stress caused at the time of pushing the protector in toward the bag attaching seat will more likely concentrate at the first cutout portions. Therefore, the protector will more readily deform elastically, so that the workability can be further improved.

In the foregoing side curtain airbag fastening structure, the first cutout portions of the protector may be provided in portions of the protector which are relatively near the grab rail attaching seats in the vehicle front-rear direction.

In this construction, because the first cutout portions are provided relatively near the grab rail attaching seats, a certain length of a portion of the protector which extends between the first cutout portions in the front-rear direction can be secured, so that a certain amount of elastic deformation of the protector can be secured. Thus, the workability can be further improved.

In the foregoing side curtain airbag fastening structure, the first cutout portions may be open downward.

In this construction, since the first cutout portions are open downward, the protector will more easily elastically deform upward when the protector is pushed upward in order to attach the bag bracket to the bag attaching seat. Thus, the workability can be further improved.

DESCRIPTION OF THE PREFERRED EMBODIMENTS

Embodiments of the present disclosure will be described with reference to the drawings. The directions, such as, front, rear, right, left, etc., mentioned in the following description are the same as the directions relative to a vehicle, unless otherwise mentioned. In each drawing, an arrow UP and an arrow FR indicate an upward direction and a forward direction, respectively. The fastening structures for side curtain airbags (hereinafter, simply referred to as "curtain airbags") according to this embodiment which are attached to opposite side portions of a vehicle in a vehicle transverse (right-left) direction are the same in construction. Therefore, in the following direction, curtain airbags provided in one of the two opposite side portions in the vehicle transverse direction will be described below.

Figure 1:
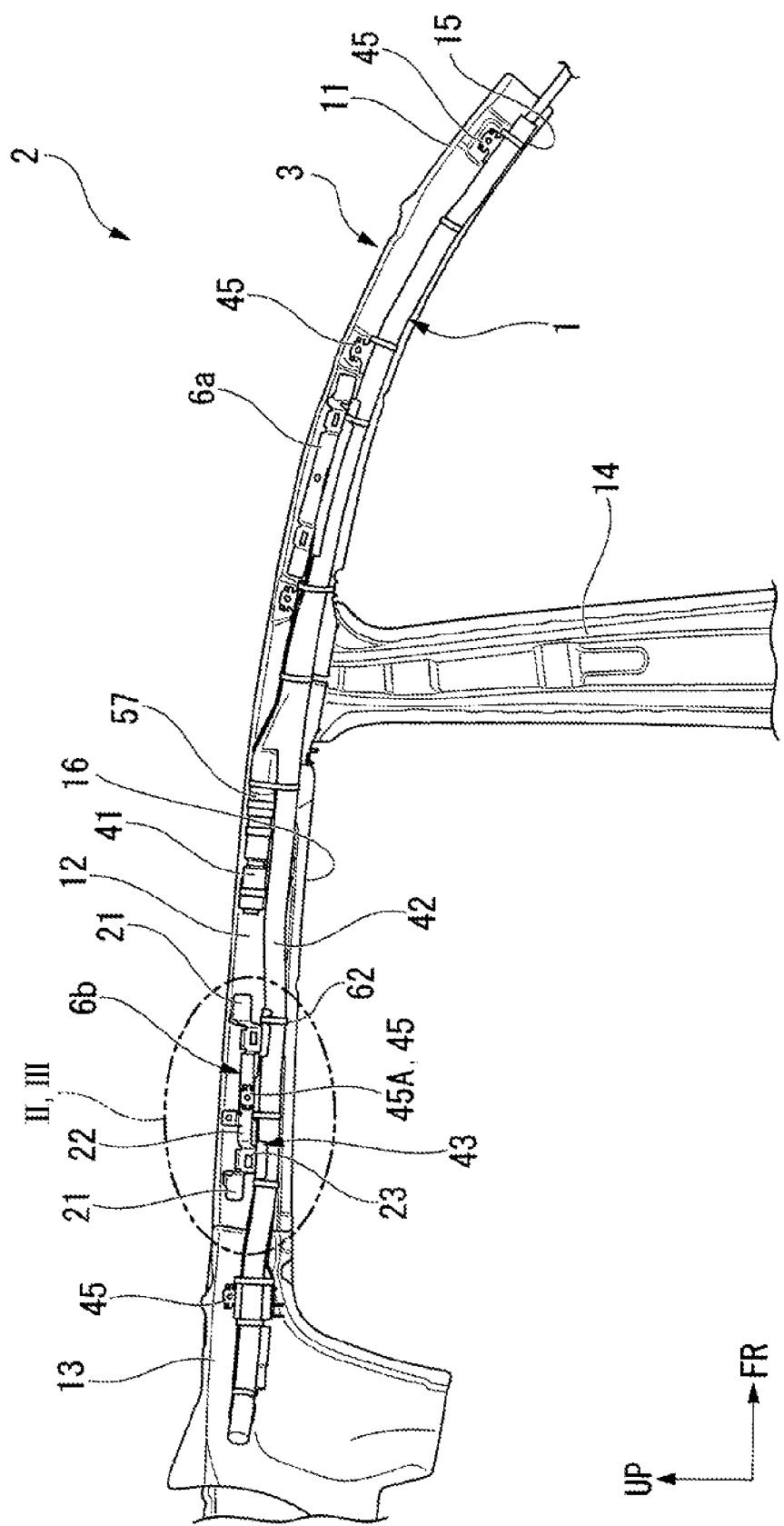
FIG. 1 is a side view of a curtain airbag attached to a vehicle according to an embodiment of the present disclosure which is viewed from an inner side in a vehicle transverse direction.

FIG. 1 is a side view of a curtain airbag 1 attached to a vehicle 2 which is viewed from an inner side in the vehicle transverse direction.

As shown in FIG. 1, a curtain airbag fastening structure includes the curtain airbag 1 attached to a roof side portion 3 of the vehicle 2 and grab rail brackets 6a and 6b for attaching grab rails (not shown in the drawings) to the roof side portion 3. In this embodiment, the roof side portion 3 is a portion that extends in a front-rear direction of the vehicle 2 from a front pillar 11 to a rear pillar 13 along a roof side rail 12. A center pillar 14 extends downward from a central portion of the roof side rail 12 in the front-rear direction. A front door opening portion 15 is defined below the roof side portion 3 and in front of the center pillar 14. A rear door opening portion 16 is defined below the roof side portion 3 and in rear of the center pillar 14.

The grab rail brackets 6a and 6b are provided at locations in the roof side portion 3 in the front-rear direction which correspond to the front and rear door-opening portions 15 and 16, respectively. In the following description, of the two grab rail brackets 6a and 6b, the grab rail bracket 6b provided at the location that corresponds to the rear door opening portion 16 will be described.

Figure 2:
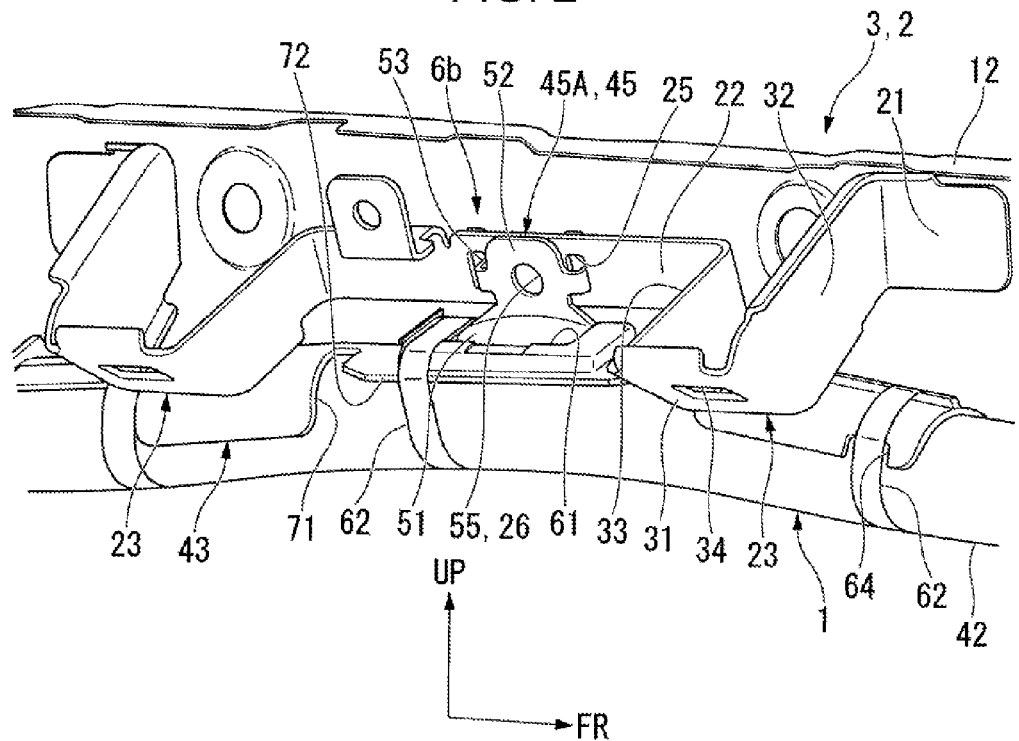
FIG. 2 is a perspective view of a portion II shown in FIG. 1 which is viewed from the inner side in the vehicle transverse direction.
Figure 3:
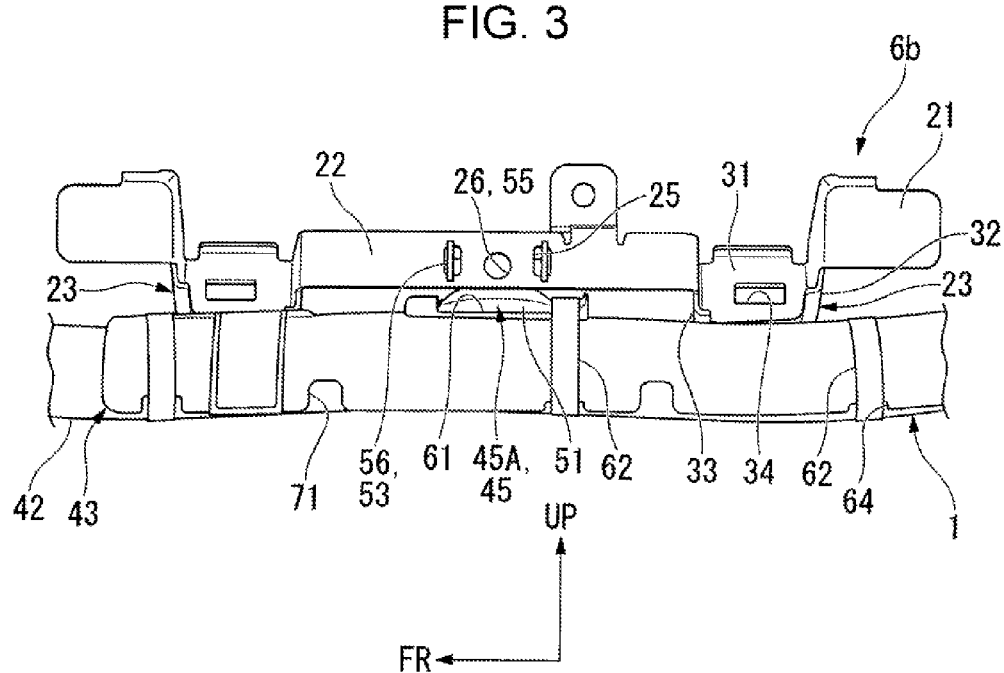
FIG. 3 is a side view of the portion III shown in FIG. 1 which is viewed from an outer side in the vehicle transverse direction.

FIG. 2 is a perspective view of a portion II shown in FIG. 1 which is viewed from the inner side in the vehicle transverse direction. FIG. 3 is a side view of the portion III in FIG. 1 which is viewed from an outer side in the vehicle transverse direction. Incidentally, in FIG. 3, the aforementioned roof side rail 12 is omitted from the illustration.

As shown in FIGS. 2 and 3, the grab rail bracket 6b is formed by, for example, press-forming an elongated metal sheet, and is attached to the roof side portion 3 (to the roof side rail 12) with its lengthwise direction coinciding with the vehicle front-rear direction. The grab rail bracket 6b has two vehicle body attaching seats 21 that are provided at two opposite ends of the grab rail bracket 6b in the front-rear direction and that are fixed to the roof side rail 12, a bag attaching seat 22 provided between the vehicle body attaching seats 21, and two grab rail attaching seats 23 provided between the bag attaching seat 22 and the two vehicle body attaching seats 21.

The bag attaching seat 22 is a seat to which to attach the curtain airbag 1, extends in the front-rear direction along the roof side rail 12, and is spaced inward in the vehicle transverse direction from the roof side rail 12. The bag attaching seat 22 is provided with two locking holes 25 with which a bag bracket 45A of the curtain airbag 1 (which will be described below) is locked. Of the bag attaching seat 22, a portion between the locking holes 25 in the front-rear direction is provided with an insertion hole 26 into which a bolt (not shown) for fastening the bag bracket 45A to the bag attaching seat 22 is inserted.

Each grab rail attaching seat 23 has a C shape that is substantially convex inward in the vehicle transverse direction in a plan view from above. The grab rail attaching seats 23 are connected and extend between the bag attaching seat 22 and the vehicle body attaching seats 21. Concretely, each grab rail attaching seat 23 has an attaching portion 31 located to the inner side of the bag attaching seats 22 in the vehicle transverse direction and two bent pieces 32 and 33 that are bent outward in the vehicle transverse direction from two opposite ends of the attaching portion 31 in the front-rear direction.

The attaching portion 31 of each grab rail attaching seat 23 is spaced inward in the vehicle transverse direction from the roof side rail 12. Each attaching portion 31 has an attaching hole 34 to which the grab rail is attached. Incidentally, the grab rail has, for example, an arch shape that is bulged inward in the vehicle transverse direction, and two opposite end portions of the grab rail are separately attached to the attaching holes 34.

Of the bent pieces 32 and 33 of each grab rail attaching seat 23, the bent piece 32 located at an extreme side (i.e., an end side) in the grab rail bracket 6b in the front-rear direction (i.e., located at an adjacent vehicle body attaching seat 21 side) is continuously connected, at its outer-side end in the vehicle transverse direction, to an intermediate-side end of the adjacent vehicle body attaching seat 21 in the grab rail bracket 6b in the front-rear direction (to a bag attaching seat 22-side end of the adjacent vehicle body attaching seat 21).

The bent piece 33 located at the intermediate side in the grab rail bracket 6b in the front-rear direction is continuously connected, at its outer-side end in the vehicle transverse direction, to the bag attaching seat 22. In the example shown in FIGS. 2 and 3, the bent pieces 32 and 33 of the grab rail attaching seats 23 extend downward as the bent pieces 32 and 33 extend inward in the vehicle transverse direction.

As shown in FIG. 1, the curtain airbag 1 includes an inflator 41 that generates high-pressure gas, a bag body 42 that is deployed due to introduction of the high-pressure gas generated by the inflator 41, and a protector 43 that holds the bag body 42 and guides the deployment of the bag body 42.

The bag body 42 has been folded in a roll fold manner, a zigzag fold manner, etc. and extends in such a folded state in the front-rear direction along the roof side portion 3. When an impact is input to the vehicle 2 at the time of a side collision or the like, the bag body 42 is deployed downward from the roof side portion 3 into a curtain shape to protect an occupant. The bag body 42 is provided with a plurality of bag brackets 45 for attaching the curtain airbag 1 to the roof side portion 3. The bag brackets 45 are spaced from each other in the front-rear direction.

The bag brackets 45 have been formed into a bent shape by, for example, press-forming a metal sheet or the like. The bag brackets 45 are attached directly to the roof side portion 3 or indirectly to the roof side portion 3 via the foregoing bag attaching seat 22 of the grab rail bracket 6b. In the following description, of the bag brackets 45, the bag bracket 45A attached to the bag attaching seat 22 will be described.

As shown in FIG. 2, the bag bracket 45A has an attaching base 51 that is attached to the bag body 42, an attaching tab 52 protruded upward from the attaching base 51, and two hook portions 53 bent outward in the vehicle transverse direction from two opposite ends of the attaching tab 52 in the front-rear direction.

The attaching base 51 is connected to the bag body 42 via a connection portion (not shown) formed on the bag body 42.

In the attaching tab 52, an insertion hole 55 into which a bolt (not shown) is inserted is formed at a location such as to coincide with the foregoing insertion hole 26 when viewed in the vehicle transverse direction. The bag bracket 45A is fastened to the bag attaching seat 22 by screwing a nut (not shown) onto a bolt inserted through the insertion hole 26 of the bag attaching seat 22 and the insertion hole 55 of the attaching tab 52.

The hook portions 53 extend from the attaching tab 52 in a cantilever fashion. A distal end portion of each hook portion 53 is provided with a widened portion 56 (see FIG. 3) that is wider in the up-down direction than a proximal end portion of the hook portion 53. The hook portions 53 are inserted into the locking holes 25 of the bag attaching seat 22 so that the widened portions 56 are locked with the bag attaching seat 22.

As shown in FIG. 1, the inflator 41 has a cylindrical shape and is attached to a central portion of the roof side portion 3 in the front-rear direction (in the example shown in FIG. 1, a portion of the roof side portion 3 which is located in rear of the center pillar 14). The inflator 41 is connected at its gas supply portion (not shown) to a gas introduction portion 57 of the bag body 42.

As shown in FIGS. 2 and 3, the protector 43 is made of a resin material or the like and has a semicircular shape that is open downward in a cross-sectional view taken on a line in the vehicle transverse direction. The protector 43 extends so that an axis direction thereof is substantially parallel with the roof side portion 3. Inside the protector 43, the bag body 42 is disposed from below. Of the protector 43, a portion located at substantially the same location as the bag bracket 45A in the front-rear direction is provided with an extraction hole 61 through which the bag bracket 45A is extracted out of the protector 43.

The protector 43 is provided with tapes 62 that bind the protector 43 and the bag body 42 together. As for the tapes 62, a plurality of tapes 62 are wound around the protector 43 and the bag body 42 and are spaced from each other in the front-rear direction. Thus, the bag body 42 is held in a folded state within the protector 43. Around the grab rail bracket 6b, tapes 62 on the protector 43 are provided in rear of the extraction hole 61 and at the extreme sides of the grab rail attaching seats 23 in the grab rail bracket 6b in the front-rear direction.

Of the protector 43, portions on which the tapes 62 are wound are provided with tape securement portions (second cutout portions) 64 for positioning the tapes 62 relative to the protector 43. The tape securement portions 64 are provided in an arrangement of pairs in which two tape securement portions 64 are formed in both end portions of the protector 43 in its circumferential direction in a cross-sectional view taken on a line in the vehicle transverse direction. Concretely, the tape securement portions 64 are cutouts that extend in the circumferential directions of the protector 43 to the two end edges of the protector 43 in the circumferential directions and therefore are open downward. The tape securement portions 64 are wider in the front-rear direction than the tapes 62, so that each tape securement portion 64 houses inside thereof a portion of the tape 62.

Of the protector 43, portions located between the grab rail attaching seats 23 and, at the same time, at both sides of the bag bracket 45A in the front-rear direction are provided with cutout portions (first cutout portions) 71 that serve as start points of elastic deformation of the protector 43. The cutout portions 71 are provided in an arrangement of pairs in which two cutout portions 71 are formed in both end portions of the protector 43 in the circumferential directions in a cross-sectional view taken on a line in the vehicle transverse direction. The cutout portions 71 extend parallel with the tape securement portions 64 in the circumferential directions (directions of extension) of the protector 43 to the two end edges of the protector 43 in the circumferential directions and are open downward.

In this embodiment, the cutout portions 71 have substantially the same width in the front-rear direction as the tape securement portions 64 and a greater length in the circumferential directions of the protector 43 than the tape securement portions 64. Note that, of the cutout portions 71, the cutout portions 71 located at the inner side in the vehicle transverse direction are longer in the circumferential directions of the protector 43 than the cutout portions 71 located at the outer side in the vehicle transverse direction.

The cutout portions 71 are provided at locations that are between the bag bracket 45A and the grab rail attaching seats 23 in the front-rear direction and that, at the same time, are relatively close to the grab rail attaching seats 23 than to the bag bracket 45A. It is preferable that the extreme-side end edge of each cutout portion 71 in the front-rear direction be located at the intermediate side of the bent piece 33 of the adjacent one of the grab rail attaching seats 23 in the front-rear direction. However, provided that at least the intermediate-side end edge of a cutout portion 71 in the front-rear direction is located at the intermediate side of the bent piece 33 of the adjacent grab rail attaching seat 23 in the front-rear direction, the cutout portion 71 may be, for example, astride the bent piece 33 in the front-rear direction.

Furthermore, as shown in FIG. 2, of the protector 43, a portion between the foregoing grab rail attaching seats 23 in the front-rear direction has a recess portion 72 that is formed in an inner-side end portion of the protector 43 in the vehicle transverse direction. The recess portion 72, extending in the front-rear direction, connects between the cutout portions 71 that are provided at the inner side in the vehicle transverse direction and is open downward.

Figure 4:
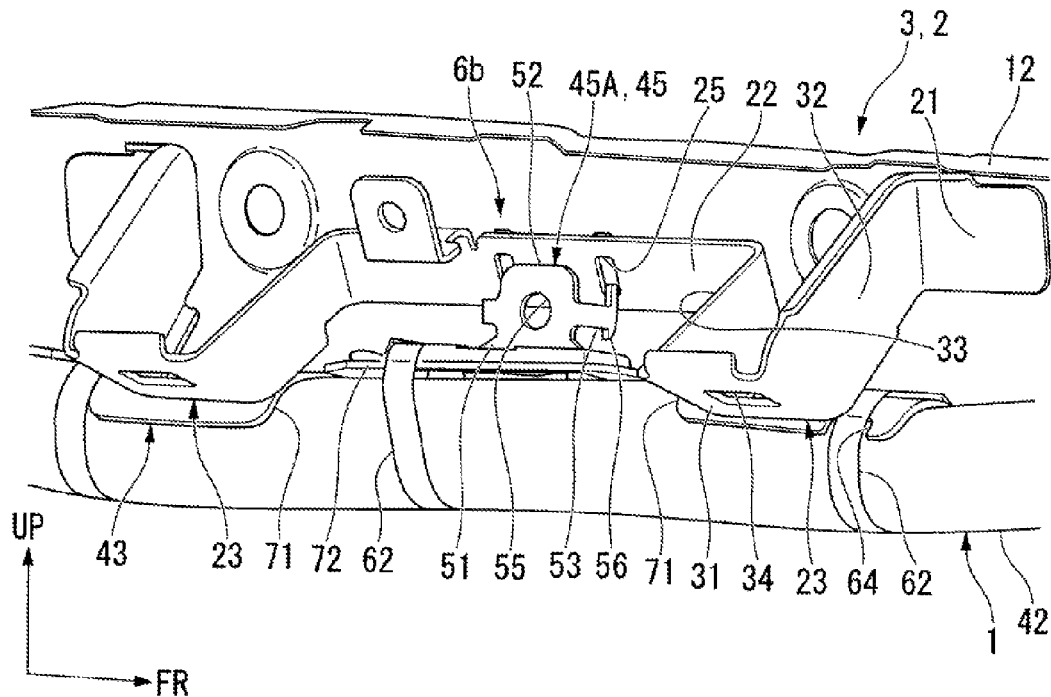
FIG. 4 is an illustrative diagram for illustrating an attaching method for the curtain airbag, being a perspective view that corresponds to the view shown in FIG. 2.
Figure 5:
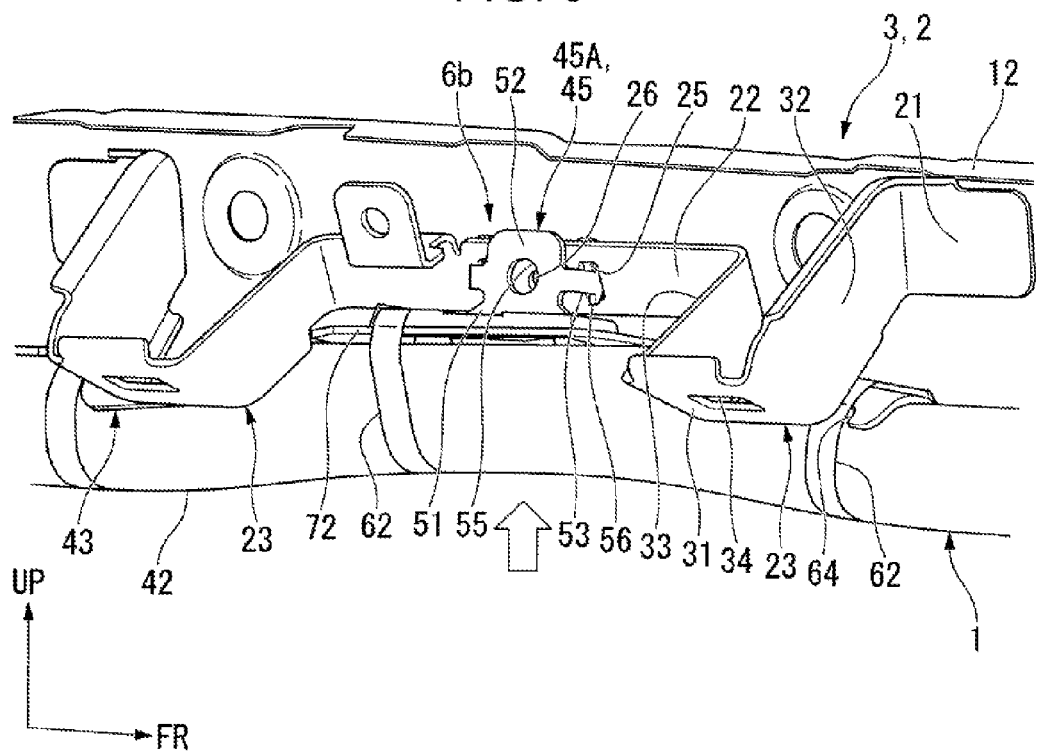
FIG. 5 is an illustrative diagram for illustrating the attaching method for the curtain airbag, being a perspective view that corresponds to the view shown in FIG. 2.
Figure 6:
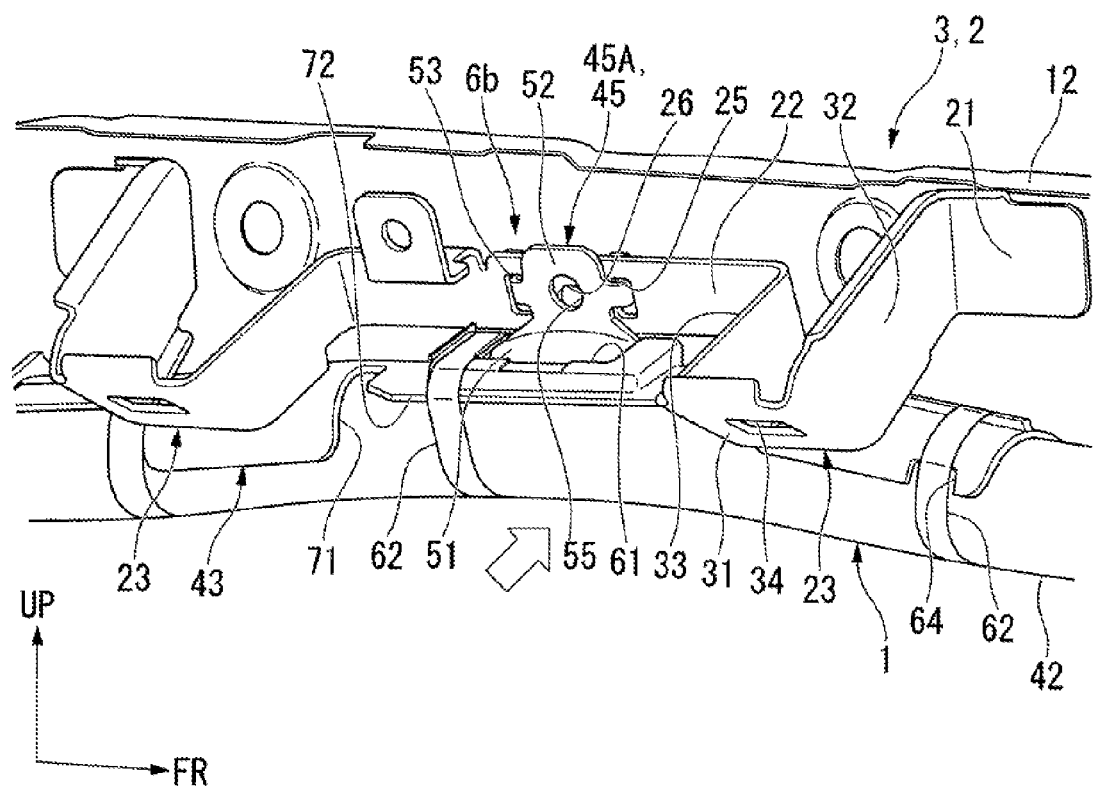
FIG. 6 is an illustrative diagram for illustrating the attaching method for the curtain airbag, being a perspective view that corresponds to the view shown in FIG. 2.

Next, an attaching method for the foregoing curtain airbag 1 will be described. FIGS. 4 to 6 are perspective diagrams for illustrating the attaching method for the curtain airbag 1, corresponding to FIG. 2. Note that the following description will be made in conjunction with a case where the bag bracket 45A is attached to the bag attaching seat 22.

First, as shown in FIG. 4, after the bag bracket 45A and the bag attaching seat 22 are positioned to each other in the front-rear direction, the curtain airbag 1 is raised upward, with the protector 43 facing upward. Then, the protector 43 comes, from below, into contact with the bent pieces 32 and 33 of the grab rail attaching seats 23, so that the upward movement of the curtain airbag 1 relative to the grab rail bracket 6b is restricted.

Subsequently, as shown in FIG. 5, the curtain airbag 1 is raised upward (in a mounting direction), for example, by holding the curtain airbag 1 and the bag attaching seat 22. Then, stress concentrates at the cutout portions 71 of the protector 43, so that the protector 43 elastically deforms, with the cutout portions 71 serving as start points. As a result, of the protector 43, a portion located between the grab rail attaching seats 23 (hereinafter, referred to as "central portion") is pushed upward together with the bag body 42, with the grab rail attaching seats 23 serving as fulcrums (see an arrow in FIG. 5).

Then, as shown in FIG. 6, after the protector 43 is pushed upward to such a position that the hook portions 53 (widened portions 56) of the bag bracket 45A are at substantially the same position in the up-down direction as the locking holes 25 of the bag attaching seat 22, the protector 43 is pushed in outward in the vehicle transverse direction (see an arrow in FIG. 6). Thus, the hook portions 53 of the bag bracket 45A are inserted into the locking holes 25 of the bag attaching seat 22.

After that, as shown in FIG. 2, the upward pushing of the curtain airbag 1 is discontinued, the protector 43 undergoes restoring deformation, with the central portion of the protector 43 moving downward together with the bag body 42. As a result, the widened portions 56 of the hook portions 53 are locked within the locking holes 25, tentatively fastening the bag bracket 45A to the bag attaching seat 22. Note that, in this tentatively fastened state, the insertion hole 55 of the bag bracket 45A and the insertion hole 26 of the bag attaching seat 22 coincide with each other when viewed from the vehicle transverse direction.

After a bolt is inserted through the insertion holes 26 and 55 of the bag attaching seat 22 and the bag bracket 45A, a nut is screwed onto the bolt. Thus, the bag bracket 45A is fastened to the bag attaching seat 22.

As described above, this embodiment has a construction in which the portions of the protector 43 which are located at both sides of the bag attaching seat 22 in the front-rear direction are provided with the cutout portions 71.

According to this construction, when, at the time of attaching the bag bracket 45A, the protector 43 is pushed upward after the protector 43 has come to interfere with the grab rail attaching seats 23, the protector 43 relatively easily deform elastically, with the cutout portions 71 serving as start points of elastic deformation. This improves the workability at the time of assembling the bag bracket 45A and the bag attaching seat 22.

Furthermore, since the length of the cutout portions 71 in the circumferential directions of the protector 43 is greater than that of the tape securement portions 64, stress caused by pushing the protector 43 upward concentrates more readily at the cutout portions 71, so that the protector 43 more easily deforms elastically. Thus, the workability can be further improved.

Furthermore, in this embodiment, the cutout portions 71 are located relatively near to the grab rail attaching seats 23. This secures a certain length of a portion of the protector 43 which extends between the cutout-portions 71 in the front-rear direction (a central portion of the protector 43) in the front-rear direction and therefore secures a certain amount of elastic deformation of the protector 43. Thus, the workability can be further improved.

Further, since the cutout portions 71 are open downward, the upward pushing of the protector 43 more easily causes upward elastic deformation of the protector 43. Thus, the workability can be further improved.

Incidentally, the technical scope of the present disclosure is not limited by the foregoing embodiments or the like but encompasses various changes and modifications that can be made to the foregoing embodiments without departing from the gist of the disclosure. That is, the constructions and the like shown above in conjunction with the embodiments are mere examples and can be changed as appropriate.

For example, although in the foregoing embodiments, the cutout portions 71 are open downward, the present disclosure is not limited to this construction but can include any construction or the like that serve as a start point of elastic deformation of the protector 43.

Furthermore, in the foregoing embodiments, the cutout portions 71 are provided in an arrangement of pairs in which two tape securement portions 64 are formed in both end portions of the protector 43 in its circumferential directions in a cross-sectional view taken on a line in the vehicle transverse direction. However, this construction does not restrict the present disclosure. Still further, although in the foregoing embodiment, the cutout portions 71 are provided relatively near the grab rail attaching seats 23, this is not restrictive but the cutout portions 71 may be formed at the bag attaching seat 22 side.

Further, portions of the protector 43 which are located at both sides of the bag attaching seat 22 in the front-rear direction are each provided with a plurality of cutout portions 71 that are spaced in the front-rear direction.

Although in the foregoing embodiments, the protector 43 has a semicircular shape, this construction is not restrictive. The present disclosure may include any shape or configuration that holds the bag body 42 and that guides deployment of the bag body 42.

Although in the foregoing embodiments, the bag bracket 45A is tentatively fastened to the bag attaching seat 22 via the hook portions 53 before the bag bracket 45A and the bag attaching seat 22 are fastened together by a bolt and a nut, this is not restrictive. The bag bracket 45A and the bag attaching seat 22 may be fastened directly by a bolt and a nut without tentative fastening. Furthermore, the bag bracket 45A and the bag attaching seat 22 may be fastened together by a method other than the method that uses a bolt and a nut.

Furthermore, although in the foregoing embodiments, the present disclosure is applied to the grab rail bracket 6b provided on the roof side rail 12, the present disclosure is not limited by this but is applicable regardless of the location on the roof side portion 3.

Furthermore, although in the foregoing embodiments, the grab rail attaching seats 23 and the bag attaching seat 22 are formed together as the grab rail bracket 6b, this is not restrictive, that is, the grab rail attaching seats 23 and the bag attaching seat 22 may be provided as separate members. Specifically, it suffices that the bag attaching seat 22 is disposed between the grab rail attaching seats 23.

Further, although in the foregoing embodiments, the curtain airbag 1 is pushed upward to attach the bag bracket 45A to the bag attaching seat 22, this is not restrictive. For example, the bag bracket 45A may be attached to the bag attaching seat 22 by pushing in the curtain airbag 1 downward or in the vehicle transverse direction. In this case, it is preferable that cutout portions 71 extend in the direction in which to push in the curtain airbag 1 (i.e., in the mounting direction)).

Component elements in the foregoing embodiments can be replaced by known component elements as appropriate, or the foregoing modifications and the like may be combined as appropriate, without departing from the gist of the present disclosure.

What is claimed is:

1. A side curtain, airbag fastening structure comprising:
    two grab rail attaching seats which are protruded inward in a vehicle transverse direction from a roof side portion of a vehicle and spaced from each other in a vehicle front-rear direction and to which a grab rail is attached; and
    a side curtain airbag that is attached to the roof side portion and that comprises,
        a bag body that is deployed into a curtain shape from the roof side portion when an impact is input,
        a protector that holds the bag body and that guides deployment of the bag body, and
        a bag bracket that is fastened to a bag attaching seat and that supports the protector provided with the bag body at a location between the two grab rail attaching seats such that the protector and the bag body of the side curtain airbag are disposed along the roof side portion and in a vicinity of the two grab rail attaching seats, and
    wherein the bag bracket has first cutout portions at the location between the two grab rail attaching seats and on both sides of the bag bracket in the vehicle front-rear direction.

2. The side curtain airbag fastening structure according to claim 1, further comprising a tape that binds the bag body and the protector together, wherein:
    the protector has a second cutout portion that extends along a direction in which the first cutout portions extend and at a location that holds the tape in its position; and
    a length of the first cutout portions in the extending direction thereof is greater than a length of the second cutout portion in the extending direction thereof.

3. The side curtain airbag fastening structure according to claim 1, wherein
    the first cutout portions of the protector are provided in a vicinity of the grab rail attaching seats in the vehicle front-rear direction.

4. The side curtain airbag fastening structure according to claim 1, wherein
    the first cutout portions are open downward.

* * * * *